US012570817B2

(12) United States Patent
Yan et al.

(10) Patent No.: US 12,570,817 B2
(45) Date of Patent: Mar. 10, 2026

(54) POROUS COMPOSITE MATERIAL FOR SOUND ABSORPTION AND METHOD OF PRODUCING SAME

(71) Applicant: Agency for Science, Technology and Research, Singapore (SG)

(72) Inventors: Hong Yan, Singapore (SG); Kui Yao, Singapore (SG); Shuting Chen, Singapore (SG); Poh Chong Lim, Singapore (SG)

(73) Assignee: Agency for Science, Technology and Research, Connexis North (SG)

( * ) Notice: Subject to any disclaimer, the term of this patent is extended or adjusted under 35 U.S.C. 154(b) by 1037 days.

(21) Appl. No.: 17/622,358

(22) PCT Filed: Aug. 4, 2020

(86) PCT No.: PCT/SG2020/050449
§ 371 (c)(1),
(2) Date: Dec. 23, 2021

(87) PCT Pub. No.: WO2021/025619
PCT Pub. Date: Feb. 11, 2021

(65) Prior Publication Data
US 2022/0243022 A1 Aug. 4, 2022

(30) Foreign Application Priority Data
Aug. 5, 2019 (SG) ............................ 10201907195P

(51) Int. Cl.
| | |
|---|---|
| *C08J 9/00* | (2006.01) |
| *C08G 18/76* | (2006.01) |
| *C08G 101/00* | (2006.01) |
| *C08J 9/06* | (2006.01) |
| *C08J 9/12* | (2006.01) |
| *C08K 3/16* | (2006.01) |
| *C08L 75/04* | (2006.01) |
| *C08L 79/08* | (2006.01) |
| *C08L 83/04* | (2006.01) |
| *E04B 1/84* | (2006.01) |
| *G10K 11/162* | (2006.01) |
| *G10K 11/165* | (2006.01) |

(52) U.S. Cl.
CPC ........ *C08J 9/0004* (2013.01); *C08G 18/7664* (2013.01); *C08J 9/0061* (2013.01); *C08J 9/06* (2013.01); *C08J 9/12* (2013.01); *C08L 75/04* (2013.01); *C08L 79/08* (2013.01); *C08L 83/04* (2013.01); *E04B 1/84* (2013.01); *G10K 11/162* (2013.01); *G10K 11/165* (2013.01); *C08G 2101/00* (2013.01); *C08G 2110/00* (2021.01); *C08G 2350/00* (2013.01); *C08J 2201/03*

(2013.01); *C08J 2205/044* (2013.01); *C08J 2375/04* (2013.01); *C08J 2383/04* (2013.01); *C08J 2427/16* (2013.01); *C08J 2479/08* (2013.01); *C08K 2003/164* (2013.01)

(58) Field of Classification Search
CPC ..... C08J 9/0004; C08J 9/06; C08J 9/12; C08J 9/0061; C08J 2201/03; C08J 2205/044; C08J 2383/04; C08J 2375/04; C08J 2427/16; C08J 2479/08; C08K 2003/164; C08K 3/041; C08K 3/16; C08G 2350/00; C08G 2110/00; C08G 2101/00; C08G 18/7664; C08L 79/08; C08L 83/04; C08L 75/04; C08L 27/16; E04B 1/84; G10K 11/162; G10K 11/165
See application file for complete search history.

(56) References Cited

FOREIGN PATENT DOCUMENTS

| | | |
|---|---|---|
| CN | 109135018 A | 1/2019 |
| WO | 2018132075 A1 | 7/2018 |

OTHER PUBLICATIONS

Statharas, E. C. et al., Polyurethane/poly(vinylidene fluoride)/MWCNT composite foam for broadband airborne sound absorption., Journal of Applied Polymer Science, Apr. 29, 2019, pp. 1-6, No. 47868.

Huang, X. et al., Influence of aspect ratio of carbon nanotubes on crystalline phases and dielectric properties of poly(vinyldene fluoride)., European Polymer Journal, Feb. 2009, pp. 377-386, vol. 45.

Ezquerra, T.A. et al., On the electrical conductivity of PVDF composites with different carbon-based nanoadditives., Colloid and Polymer Science, 23, May 2014, vol. 292, No. 8, pp. 1989-1998.

Eswaraiah, Varrla, Venkataraman Sankaranarayanan, and Sundara Ramaprabhu, Functionalized graphene-PVDF foam composites for EMI shielding., Macromolecular Materials and Engineering 296.10 (2011): 894-898.

International Search Report for PCT/SG2020/050449, mailed Sep. 25, 2020.

*Primary Examiner* — Patrick D Niland
(74) *Attorney, Agent, or Firm* — NIXON PEABODY LLP

(57) ABSTRACT

A porous composite material (50) for sound absorption and a method (10) of producing the porous composite material (50) are provided. The method (10) includes preparing (12) a mixture of mechano-electrical conversion elements (56) and electro-thermal conversion elements (58) in an organic solvent. The mixture of the mechano-electrical conversion elements (56) and the electro-thermal conversion elements (58) in the organic solvent is mixed (14) with an aqueous solvent to precipitate a piezoelectric hybrid filler material (54). The piezoelectric hybrid filler material (54) is mixed (16) with a precursor. A foaming operation is performed (18) with the precursor to produce the porous composite material (50).

26 Claims, 7 Drawing Sheets

Electrical charges

Sound mechanical energy

Thermal energy

Mechano-electric conversion element 56

Polymer matrix 52

Electro-thermal conversion element 58

Polymer matrix 52

Piezoelectric hybrid filler 54

50

POROUS COMPOSITE MATERIAL FOR SOUND ABSORPTION AND METHOD OF PRODUCING SAME

CROSS-REFERENCE TO RELATED APPLICATIONS

This application is the United States National Phase of International Application No.: PCT/SG2020/050449, filed on Aug. 4, 2020, which in turn claims priority benefit of Singapore patent application Ser. No. 10201907195P, filed on Aug. 5, 2019, the entire contents of all of which are herein incorporated by reference in their entirety.

FIELD OF THE INVENTION

The present invention relates, in general, to sound absorption technology and, more particularly, to a porous composite material for sound absorption and a method of producing the same.

BACKGROUND OF THE INVENTION

As land use is further intensified in urban areas, buildings will likely have to be constructed closer to areas with high noise levels such as roads and even airports. Efficiency of commercial sound-absorbing materials is often insufficient, especially at a lower frequency range of below 2 kilohertz (kHz) which is the main frequency range of ambient noise in urban environments from traffic and construction. It would therefore be desirable to provide a material with improved sound absorption capabilities and a scalable and inexpensive method of producing the same.

SUMMARY OF THE INVENTION

Accordingly, in a first aspect, the present invention provides a method of producing a porous composite material for sound absorption. The method includes preparing a mixture of mechano-electrical conversion elements and electro-thermal conversion elements in an organic solvent. The mixture of the mechano-electrical conversion elements and the electro-thermal conversion elements in the organic solvent is mixed with an aqueous solvent to precipitate a piezoelectric hybrid filler material. The piezoelectric hybrid filler material is mixed with a precursor. A foaming operation is performed with the precursor to produce the porous composite material.

In a second aspect, the present invention provides a porous composite material for sound absorption. The porous composite material includes a porous polymer matrix and a piezoelectric hybrid filler dispersed in the porous polymer matrix. The piezoelectric hybrid filler includes mechano-electrical conversion elements and electro-thermal conversion elements.

Other aspects and advantages of the invention will become apparent from the following detailed description, taken in conjunction with the accompanying drawings.

BRIEF DESCRIPTION OF THE DRAWINGS

Embodiments of the invention will now be described, by way of example only, with reference to the accompanying drawings, in which.

DETAILED DESCRIPTION

Figure 1:
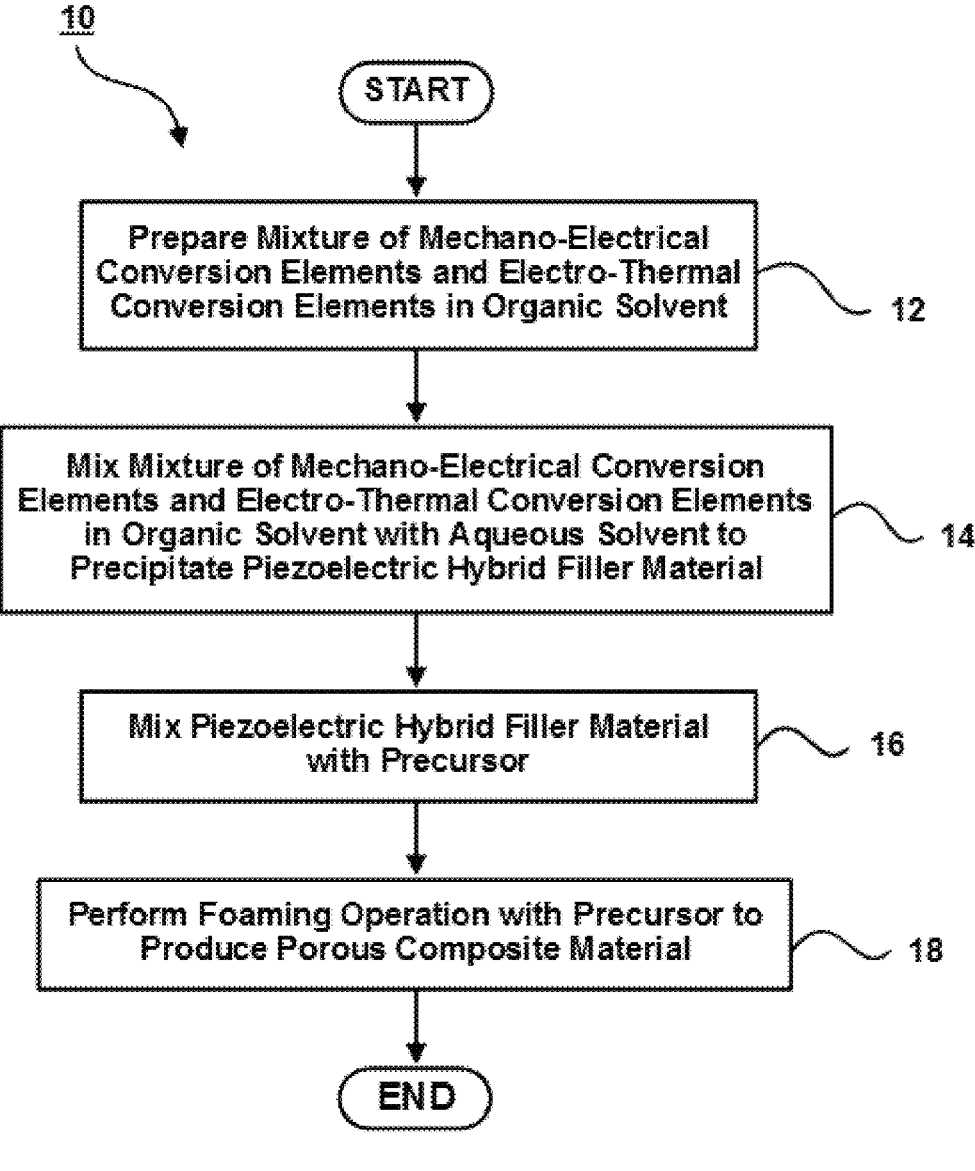
FIG. 1 is a schematic flow diagram illustrating a method of producing a porous composite material for sound absorption in accordance with an embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

The term "mechano-electrical conversion element" as used herein refers to a substance that is able to convert mechanical energy including sound energy into electrical energy. Examples of mechano-electrical conversion elements include, but are not limited to, piezoelectric polymers and polymeric electrets.

The term "piezoelectric polymer" as used herein refers a polymeric material having piezoelectric properties. Examples of piezoelectric polymers include, but are not limited to, polyvinylidene fluoride (PVDF), poly(vinylidene fluoride-trifluoroethylene) (PVDF-TrFE) and poly(vinylidene fluoride-hexafluoropropylene) (PVDF-HFP).

The term "polymeric electret" as used herein refers to a polymeric dielectric material that has a quasi-permanent electric charge or dipole polarisation. Examples of polymeric electrets include, but are not limited to, polyimide, polypropylene, polyethylene terephthalate (PET), polytetrafluoroethylene, polymethylmethacrylate, and ethylene vinyl acetate cyclic olefin copolymers.

The term "electro-thermal conversion element" as used herein refers to a substance that is able to convert electrical energy into thermal energy. Examples of electro-thermal conversion elements include, but are not limited to, electrically conductive elements and dielectric lossy elements.

The term "electrically conductive element" as used herein refers to a substance that permits passage of charged particles. Examples of electrically conductive elements include, but are not limited to, single-walled carbon nanotubes (SWCNT), multi-walled carbon nanotubes (MWCNT), graphene and carbon black.

The term "dielectric lossy element" as used herein refers to a substance or material that converts electrical energy from an alternative current (AC) into heat or a substance or material having a large quantity of electrical charge or polarization whose considerable electrical energy is dissipated as heat when an AC electric current passes through. Examples of dielectric lossy elements include, but are not limited to, partially conductive or resistive materials and hydrated or hygroscopic elements such as, for example aluminium nitrate nonahydrate, aluminium chloride hexahydrate ($AlCl_3.6H_2O$), tetra-n-butylammonium chloride and ammonium acetate.

The term "organic solvent" as used herein refers to a solvent that contains carbon and is intended to include all such organic solvents and solvent mixtures.

The term "aqueous solvent" as used herein refers to water or to a mixed solvent whose main component is water.

The terms "piezoelectric hybrid filler material" and "piezoelectric hybrid filler" as used herein refer to a homogenous mixture of mechano-electrical conversion elements and electro-thermal conversion elements produced through an aqueous precipitation process by mixing a mixture of the mechano-electrical conversion elements and the electro-thermal conversion elements with water. The examples of the mechano-electrical conversion elements and electro-thermal conversion elements are provided above. Examples of a piezoelectric hybrid filler material include, but are not limited to, homogeneous mixtures of polyvinylidene fluoride (PVDF) with single-walled carbon nanotubes (SWCNT), PVDF with multi-walled carbon nanotubes (MWCNT) and poly(vinylidene fluoride-trifluoroethylene) (PVDF-TrFE) with aluminium chloride hexahydrate ($AlCl_3.6H_2O$).

The term "precursor" as used herein refers to a substance from which a polymer matrix is formed. Examples of the precursor include, but are not limited to, a thermoplastic polymer, polyurethane (PU), silicone and latex.

The term "fire-retardant agent" as used herein refers to a substance that when added prevents fires from starting or slows the spread of fire. Examples of the fire-retardant agent include, but are not limited to, dimethyl methylphosphonate, tris(chloroisopropyl) phosphate and tris(2-chloroethyl) phosphate.

The term "chemical foam extrusion process" or "chemical foam extrusion processing" as used herein refers to a process involving a chemical foaming agent that decomposes during the extrusion process releasing an expanding gas to create a foam.

The term "chemical foam expanding process" as used herein refers to a process in which chemical reactions between two polymers occur to produce an expanding gas to create a foam.

The term "physical foam extrusion process" or "physical foam extrusion processing" as used herein refers to a process involving a physical foaming agent or gas injected directly into a molten polymer to create a porous polymer matrix.

The term "porous polymer matrix" as used herein refers to a three-dimensional network formed from a polymer or polymers, the three-dimensional network defining a plurality of void spaces.

The term "about" as used herein refers to both numbers in a range of numerals and is also used to indicate that a value includes the standard deviation of error for the device or method being employed to determine the value. The term "about" as used herein can allow for a degree of variability in a value or range, for example, within 10%, within 5%, or within 1% of a stated value or of a stated limit of a range.

Referring now to FIG. 1, a method 10 of producing a porous composite material for sound absorption is shown. The method 10 begins at step 12 by preparing a mixture of mechano-electrical conversion elements and electro-thermal conversion elements in an organic solvent.

The mechano-electrical conversion elements are capable of converting sound mechanical energy into electrical energy. Examples of the mechano-electrical conversion elements include, but are not limited to, a piezoelectric polymer and a polymeric electret. The piezoelectric polymer may be selected from polyvinylidene fluoride (PVDF)-based polymers, including homopolymer and copolymers containing a major portion of vinylidene fluoride. Examples of the piezoelectric polymer include polyvinylidene fluoride (PVDF), poly(vinylidene fluoride-trifluoroethylene) (PVDF-TrFE) and poly(vinylidene fluoride-hexafluoropropylene) (PVDF-HFP). The polymeric electret may be polyimide, polypropylene, polyethylene terephthalate (PET), polytetrafluoroethylene, polymethylmethacrylate, and ethylene vinyl acetate cyclic olefin copolymers.

The electro-thermal conversion elements are capable of converting electrical energy into thermal energy. Examples of the electro-thermal conversion elements include, but are not limited to, electrically conductive elements and dielectric lossy elements. The electrically conductive elements may be single-walled carbon nanotubes (SWCNT), multi-walled carbon nanotubes (MWCNT), graphene or carbon black. The dielectric lossy elements may be aluminium nitrate nonahydrate, aluminium chloride hexahydrate ($AlCl_3.6H_2O$), tetra-n-butylammonium chloride or ammonium acetate. In embodiments where the dielectric lossy elements are hydrated or hygroscopic elements, the piezoelectric hybrid filler material may include between about 10 percent by mass (wt %) and about 50 wt % of the dielectric lossy elements. The mixture of the mechano-electrical conversion elements and the electro-thermal conversion elements in the organic solvent may be prepared by dissolving the mechano-electrical conversion elements in the organic solvent, and then dispersing the electro-thermal conversion elements in the organic solvent. In one exemplary embodiment, a mixture suspension of mechano-electrical conversion elements and electro-thermal conversion elements may be prepared by dispersing an electro-thermal conversion element powder in an organic solution of mechano-electrical conversion elements.

At step 14, the mixture of the mechano-electrical conversion elements and the electro-thermal conversion elements in the organic solvent is mixed with an aqueous solvent to precipitate a piezoelectric hybrid filler material. The piezoelectric hybrid filler is thus produced through an aqueous precipitation process by mixing the mixture suspension of the mechano-electrical conversion elements and the electro-thermal conversion elements into the aqueous solvent. The aqueous solvent may be water. During the aqueous precipitation process, the mechano-electrical conversion elements and the electro-thermal conversion elements solidify from the organic solvent and form the piezoelectric hybrid filler. Through the aqueous precipitation process, the mechano-electrical conversion elements, such as β-phase PVDF, are generated as the piezoelectric hybrid filler with an enhanced polar structure and mixed homogeneously with the electro-thermal conversion elements. The resultant piezoelectric hybrid filler includes both mechano-electrical conversion elements and electro-thermal conversion elements. More particularly, the piezoelectric hybrid filler is made of homogenously mixed mechano-electrical conversion elements and electro-thermal conversion elements and this is crucial for enhancing the sound absorption performance of the subsequently formed piezoelectric porous composite.

At step 16, the piezoelectric hybrid filler material is mixed with a precursor. The precipitate or piezoelectric hybrid filler material from step 14 may be crushed into powder form before mixing with the precursor to facilitate dispersal within the subsequently formed porous composite material.

At step 18, a foaming operation is performed with the precursor to produce the porous composite material. The porous composite material in the form of a porous polymer matrix may be formed by a physical or chemical foaming process. Advantageously, an appropriate amount of the piezoelectric hybrid filler material may be homogenously dispersed in the porous polymer matrix through the foaming process, the porous polymer matrix serving as a scaffold for the piezoelectric hybrid filler. Further advantageously, because the foaming process is scalable, the method 10 of producing the porous composite material for sound absorption is thus scalable. The physical foaming process may be physical foam extrusion processing, and the chemical foaming process may be chemical foam extrusion processing or chemical foam expanding process. Accordingly, the foaming operation may be a physical foam extrusion process, a chemical foam extrusion process or a chemical foam expanding process.

In physical foam extrusion processing, a physical foaming agent or gas is directly injected into a molten polymer mixture of the piezoelectric hybrid filler material and the precursor to form the porous polymer matrix. In an exemplary embodiment employing physical foam extrusion processing, the step 16 of mixing the piezoelectric hybrid filler material with the precursor may include mixing between about 1% by mass and about 10% by mass of the piezoelectric hybrid filler material with between about 90% by mass and about 98% by mass of the precursor, the precursor being a thermoplastic polymer. The piezoelectric hybrid filler and the thermoplastic polymer are preferably homogeneously blended before feeding into an extrusion machine for the foaming operation at step 18.

In chemical foam extrusion processing, a chemical foaming agent decomposes during extrusion processing of a molten polymer mixture including the piezoelectric hybrid filler material, releasing an expanding gas to create a foam having a porous polymer matrix. In an exemplary embodiment employing chemical foam extrusion processing, the step 16 of mixing the piezoelectric hybrid filler material with the precursor may include mixing between about 1% by mass and about 10% by mass of the piezoelectric hybrid filler material with between about 90% by mass and about 98% by mass of the precursor and between about 1% by mass and about 10% by mass of a foaming agent, the precursor being a thermoplastic polymer. The piezoelectric hybrid filler, the thermoplastic polymer, and the foaming agent are preferably homogeneously blended before feeding into an extrusion machine for the foaming operation at step 18.

The thermoplastic polymer for physical or chemical foam extrusion processing may be poly(methyl methacrylate) (PMMA), polyamide (PA), polycarbonate (PC), polyester (PES), polyethylene (PE), polyethylene terephthalate (PET), polypropylene (PP), polystyrene (PS), polyurethane (PU), polyvinyl chloride (PVC), polyvinylidene chloride (PVDC), poly(lactic acid) (PLA), polybenzimidazole (PBI), polyoxymethylene (POM), polyether ether ketone (PEEK), polyetherimide (PEI), polyphenylene oxide (PPO), polyphenylene sulfide (PPS), polyvinylidene fluoride (PVDF), polytetrafluoroethylene (PTFE) or acrylonitrile butadiene styrene (ABS).

Heat treatment may be performed during physical or chemical foam extrusion processing to melt the mixture of the piezoelectric hybrid filler material and the precursor.

In the chemical foam expanding process, chemical reactions occur to produce inert gases and then the mixture of the piezoelectric hybrid filler material and the precursor is foamed to create the composite material having the porous polymer matrix. In exemplary embodiments employing the chemical foam expanding process, the step 16 of mixing the piezoelectric hybrid filler material with the precursor may include mixing between about 1 part and about 10 parts of the piezoelectric hybrid filler material with between about 50 parts and about 100 parts of the precursor and between about 1 part and about 2.5 parts of fire-retardant agent to form a set of reagents. The set of reagents may then be reacted with about 25 parts of the precursor during the foaming operation at step 18. The precursor may be polyurethane (PU), silicone or latex. The fire-retardant agent may be dimethyl methylphosphonate, tris(chloroisopropyl) phosphate or tris(2-chloroethyl) phosphate.

In one exemplary embodiment, the porous polymer matrix may be porous polyurethane (PU) with pores produced by a chemical foam expanding process when two liquid precursors (25 parts of PU Part A and 50 parts of PU Part B), 1 to 2.5 parts of a fire-retardant agent and 1 to 10 parts of PVDF-CNT hybrid powder are mixed and reacted.

In another exemplary embodiment, the porous polymer matrix may be porous silicone with pores produced by a chemical foam expanding process when two liquid precursors (25 parts of silicone Part A and 50 to 100 parts of silicone Part B), 1 to 2.5 parts of fire-retardant agent and 1 to 10 parts of PVDF-CNT hybrid powder are mixed and reacted.

In yet another exemplary embodiment, the porous polymer matrix may be porous latex with pores produced by a chemical foam expanding process when two liquid precursors (25 parts of latex Part A and 50 parts of latex Part B), 1 to 2.5 parts of fire-retardant agent and 1 to 10 parts of PVDF-CNT hybrid powder are mixed and reacted.

Figures 2A, 2B:
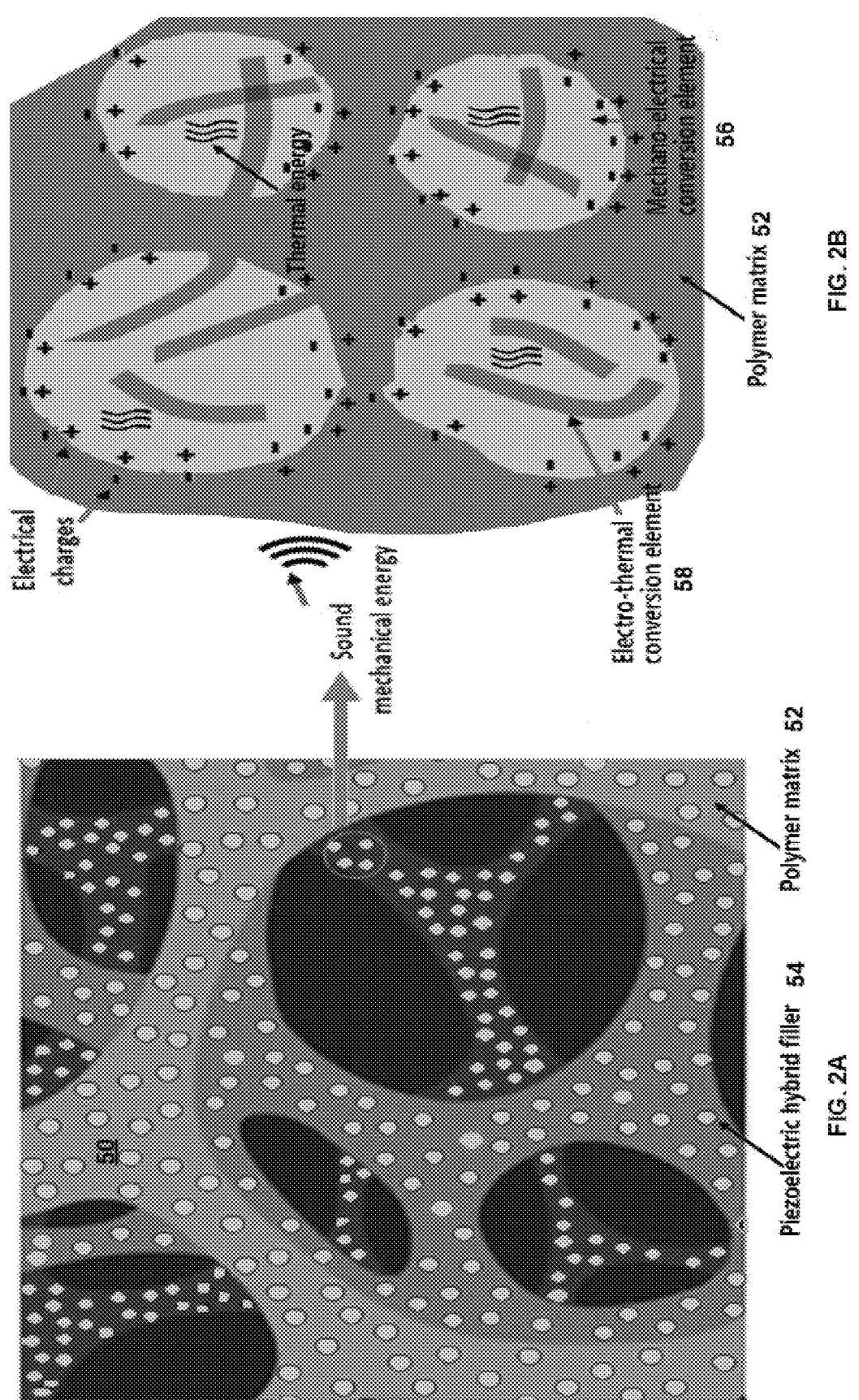
FIG. 2A is a schematic diagram illustrating a porous composite material for sound absorption in accordance with an embodiment of the present invention.
FIG. 2B is a schematic diagram illustrating an enlarged portion of the porous polymer matrix of FIG. 2A.

Referring now to FIGS. 2A and 2B, a porous composite material 50 for sound absorption produced in accordance with the method 10 is shown. The porous sound-absorbing composite 50 includes a porous polymer matrix 52 and a piezoelectric hybrid filler 54 dispersed in the porous polymer matrix 52. As can be seen from FIG. 2A, the piezoelectric hybrid filler 54 is homogeneously distributed in the porous composite matrix 52. The piezoelectric hybrid filler 54 includes mechano-electrical conversion elements 56 and electro-thermal conversion elements 58. The mechano-electrical conversion elements 56 are capable of transforming sound mechanical energy into electrical energy, whilst electro-thermal conversion elements 58 are capable of converting electrical energy into thermal energy. The piezoelectric hybrid filler 54 is thus used to improve noise absorption ability of the porous polymer matrix 52.

In addition to friction and destructive interference, incident noise as mechanical sound energy induces vibrations in the porous composite 50. These vibrations generate electrical charges through piezoelectric effect. In the present context, the piezoelectric effect is a local effect that converts mechanical energy into electric energy (charge) at a localized region and the whole composite 50 may not necessarily exhibit an overall piezoelectric performance. As can be seen from FIG. 2B, the charges generated in the composite 50 are dissipated as Joule heat through the electrically conductive or lossy elements 58. The functional combination of the mechano-electrical conversion elements 56 and the electro-thermal conversion elements 58 and their dispersion in the porous polymer matrix 52 thus enhances dissipation of sound energy, increasing sound absorption efficiency and enhancing sound absorption performance of the piezoelectric porous composite 50. Accordingly, improved sound absorption performance is obtained by introducing combined mechano-electrical and electro-thermal conversion mechanisms of the piezoelectric hybrid filler 54 in the porous composite 50, in addition to mechanical damping and other sound energy dissipation mechanisms.

The porous polymer matrix 52 may include polyurethane (PU), silicone, latex or a thermoplastic polymer. The thermoplastic polymer may be poly(methyl methacrylate) (PMMA), polyamide (PA), polycarbonate (PC), polyester (PES), polyethylene (PE), polyethylene terephthalate (PET), polypropylene (PP), polystyrene (PS), polyurethane (PU), polyvinyl chloride (PVC), polyvinylidene chloride (PVDC), poly(lactic acid) (PLA), polybenzimidazole (PBI), polyoxymethylene (POM), polyether ether ketone (PEEK), polyetherimide (PEI), polyphenylene oxide (PPO), polyphenylene sulfide (PPS), polyvinylidene fluoride (PVDF), polytetrafluoroethylene (PTFE) or acrylonitrile butadiene styrene (ABS).

The mechano-electrical conversion elements 56 may be a piezoelectric polymer or a polymeric electret. The piezoelectric polymer may be selected from polyvinylidene fluoride (PVDF)-based polymers, including homopolymer and copolymers containing a major portion of vinylidene fluoride. Examples of the piezoelectric polymer include polyvinylidene fluoride (PVDF), poly(vinylidene fluoride-trifluoroethylene) (PVDF-TrFE) and poly(vinylidene fluoride-hexafluoropropylene) (PVDF-HFP). The polymeric electret may be polyimide, polypropylene, polyethylene terephthalate (PET), polytetrafluoroethylene, polymethylmethacrylate, and ethylene vinyl acetate cyclic olefin copolymers.

The electro-thermal conversion elements 58 may include electrically conductive elements or dielectric lossy elements. The electrically conductive elements may be single-walled carbon nanotubes (SWCNT), multi-walled carbon nanotubes (MWCNT), graphene or carbon black. The dielectric lossy elements may be aluminium nitrate nonahydrate, aluminium chloride hexahydrate ($AlCl_3.6H_2O$), tetra-n-butylammonium chloride or ammonium acetate. In embodiments where the dielectric lossy elements are hydrated or hygroscopic elements, the piezoelectric hybrid filler 54 may include between about 10 percent by mass (wt %) and about 50 wt % of the dielectric lossy elements.

EXAMPLES

Example 1

There are mainly five crystalline phases with different conformations in polyvinylidene fluoride or polyvinylidene difluoride (PVDF). Amongst these, the β-phase has the highest electrical polarization. To produce a piezoelectric hybrid filler having local piezoelectric properties with β-phase PVDF, PVDF powder was dissolved in a mixed organic solvent of dimethylformamide (DMF) and acetone (1:1 in volume).

Carbon nanotubes (CNT) (with concentrations of 2 wt %, 3 wt %, 4 wt %, 5 wt % and 10 wt % in the final β-phase PVDF-CNT material) was dispersed in DMF/acetone and sonicated in an ultrasonic bath. The CNT may be multi-walled and single-walled CNT (MWCNT and SWCNT).

After pouring the mixed solution into water, the precipitation of PVDF-CNT hybrid filler was filtered and milled to a fine powder to be used as PVDF-CNT piezoelectric hybrid filler. The milled powder was heated at 100° C. to ensure complete drying.

Figure 3:
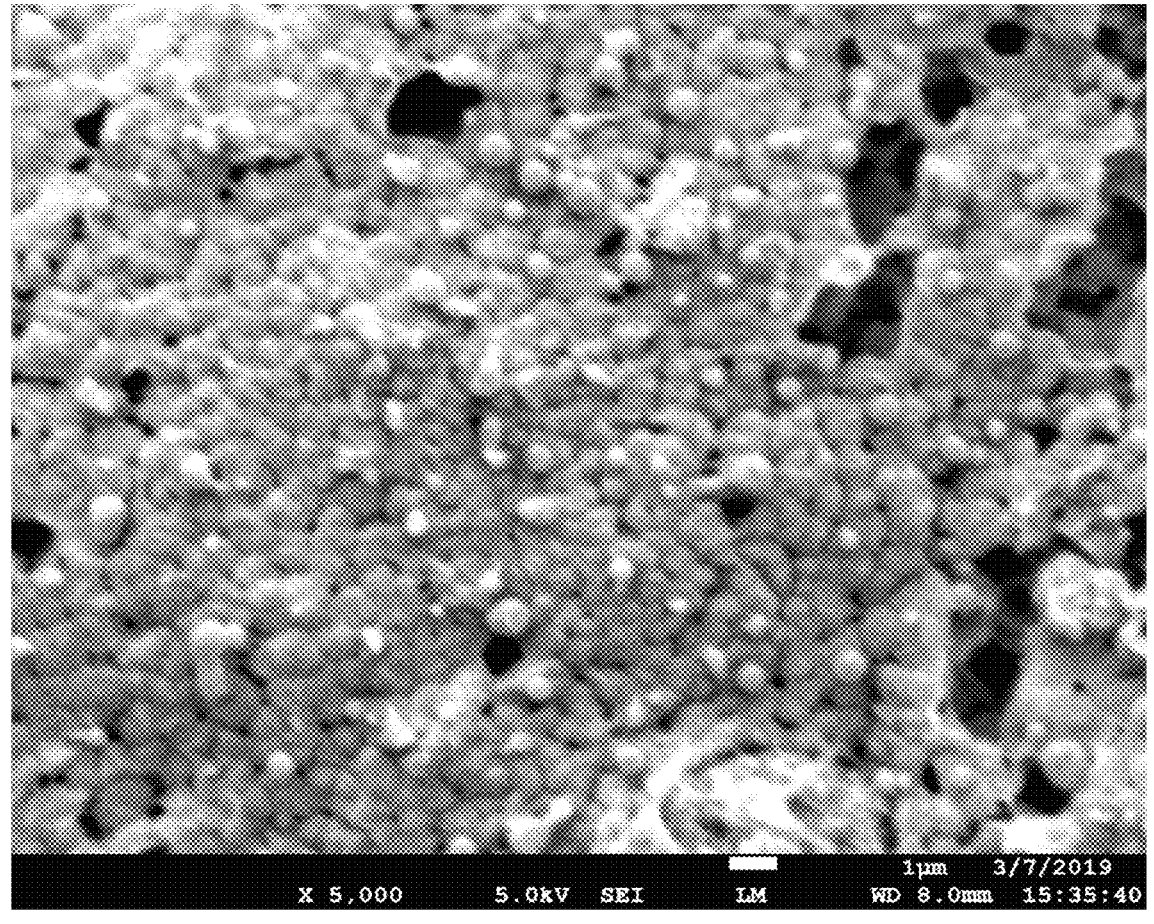
FIG. 3 is a scanning electron microscope (SEM) image of a piezoelectric hybrid filler material in accordance with an embodiment of the present invention.

Referring now to FIG. 3, a scanning electron microscope (SEM) image of PVDF/5 wt % MWCNT to be used as a piezoelectric hybrid filler is shown. The morphology of the particles of the PVDF-CNT hybrid filler can be seen in FIG. 3.

Figure 4:
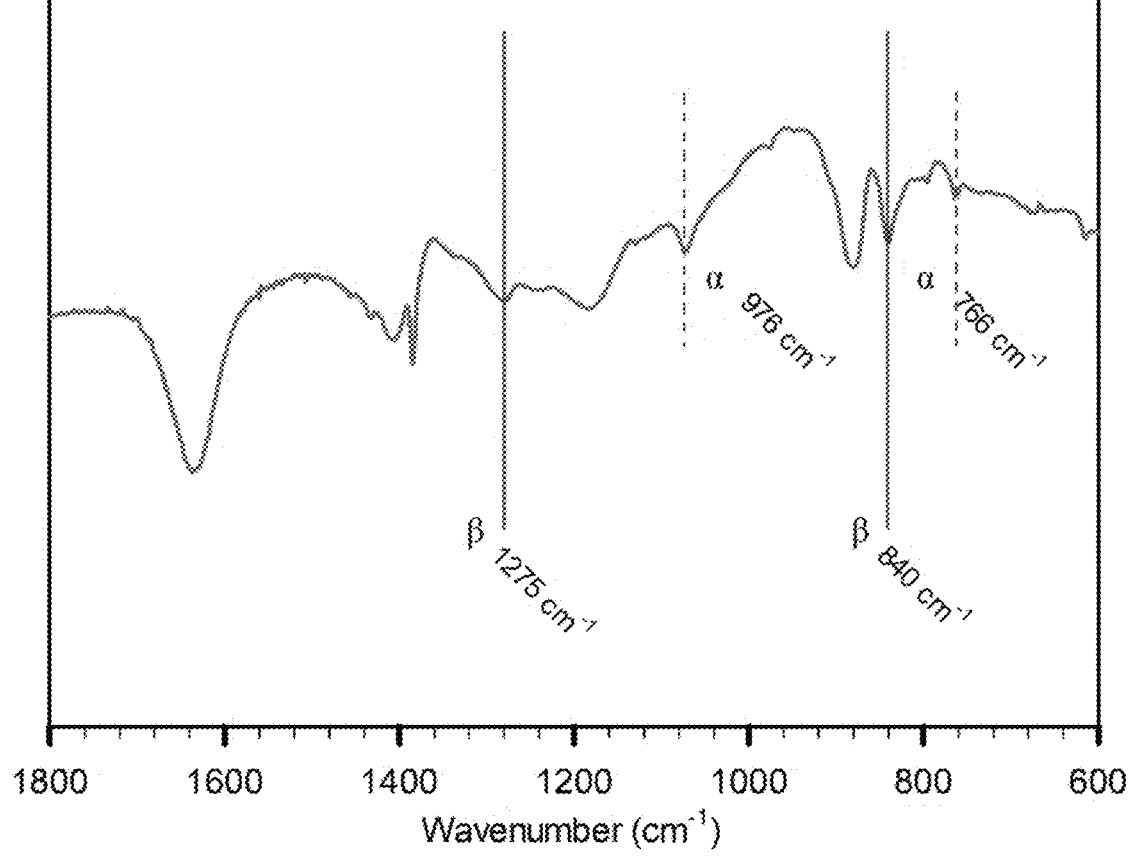
FIG. 4 is a Fourier Transform Infrared (FTIR) spectrum of the piezoelectric hybrid filler material of FIG. 3.

Referring now to FIG. 4, a Fourier Transform Infrared (FTIR) spectrum of the PVDF/5 wt % MWCNT piezoelectric hybrid filler is shown. As can be seen from FIG. 4, the PVDF-CNT hybrid filler exhibited a piezoelectric β-phase dominated structure. Transmittance peaks of β-phase PVDF at around 840 cm$^{-1}$ and 1275 cm$^{-1}$ can be seen in FIG. 4, while the α-phase peaks at 766 cm$^{-1}$ and 976 cm$^{-1}$ are inconspicuous. This demonstrates that the hybrid filler is piezoelectric active and can more effectively convert sound mechanical energy into electrical energy with the piezoelectric PVDF as mechano-electrical conversion elements.

A fabrication method of expanding foam was simplified by mixing two liquid parts (Part A and Part B) of polyurethane (PU) for chemical reaction to form a porous PU matrix foam. Part A of PU was comprised of methylene diphenyl diisocyanate (MDI) and polymeric methylene diphenyl diisocyanate (pMDI). Part B of PU was a blend of polyols, catalysts, a blowing agent, a flame retardant and a surfactant. The polyols were a part of the reactants for the chemical reaction to produce foam. The piezoelectric PVDF-CNT hybrid filler was blended into Part B of PU to enhance the sound absorption performance of the resultant porous composite of PU.

After the chemicals, including 25 parts of PU Part A, 50 parts of PU Part B, 1 to 2.5 parts of fire-retardant agent, 1 to 10 parts of PVDF-CNT hybrid powder, were mixed and reacted, the foam hardened very rapidly. The time to complete the reaction depended on the type of PU formulation and other variables. The as-prepared porous composite comprising PU foam matrix and the PVDF-CNT fillers was cut into small pieces according to different requirements. For a sound absorption test in a standard acoustic tube, the thickness of the porous PU composite was cut to 25 millimetres (mm).

Figure 5:
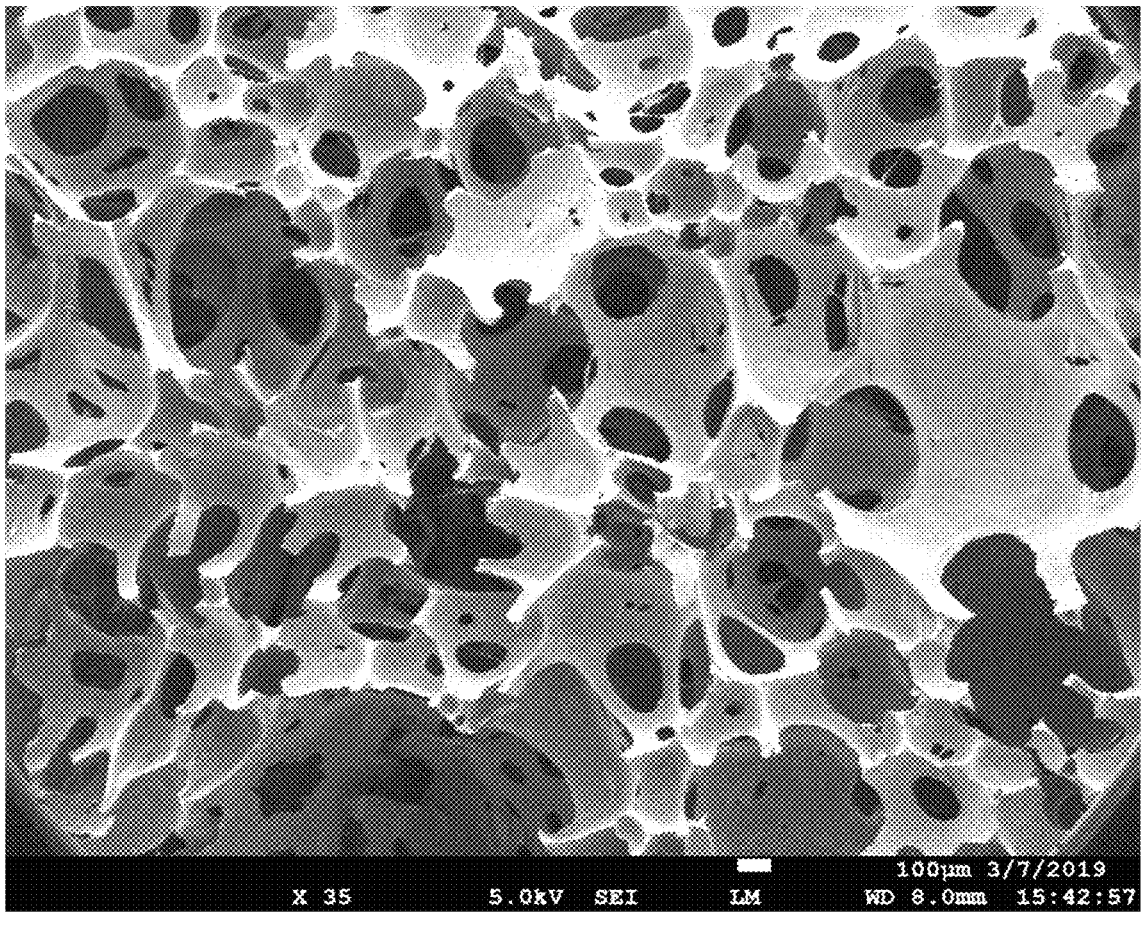
FIG. 5 is a scanning electron microscope (SEM) image of a porous composite material in accordance with an embodiment of the present invention.

Referring now to FIG. 5, a scanning electron microscope (SEM) image of a porous composite of PU with 5% PVDF-MWCNT is shown. The morphology of the porous composite comprising PU foam matrix and the 5% PVDF-MWCNT filler can be seen in FIG. 5. The porosity of the porous composite was approximately 89% and pore size was in a range of 50 to 600 microns (μm).

Figure 6:
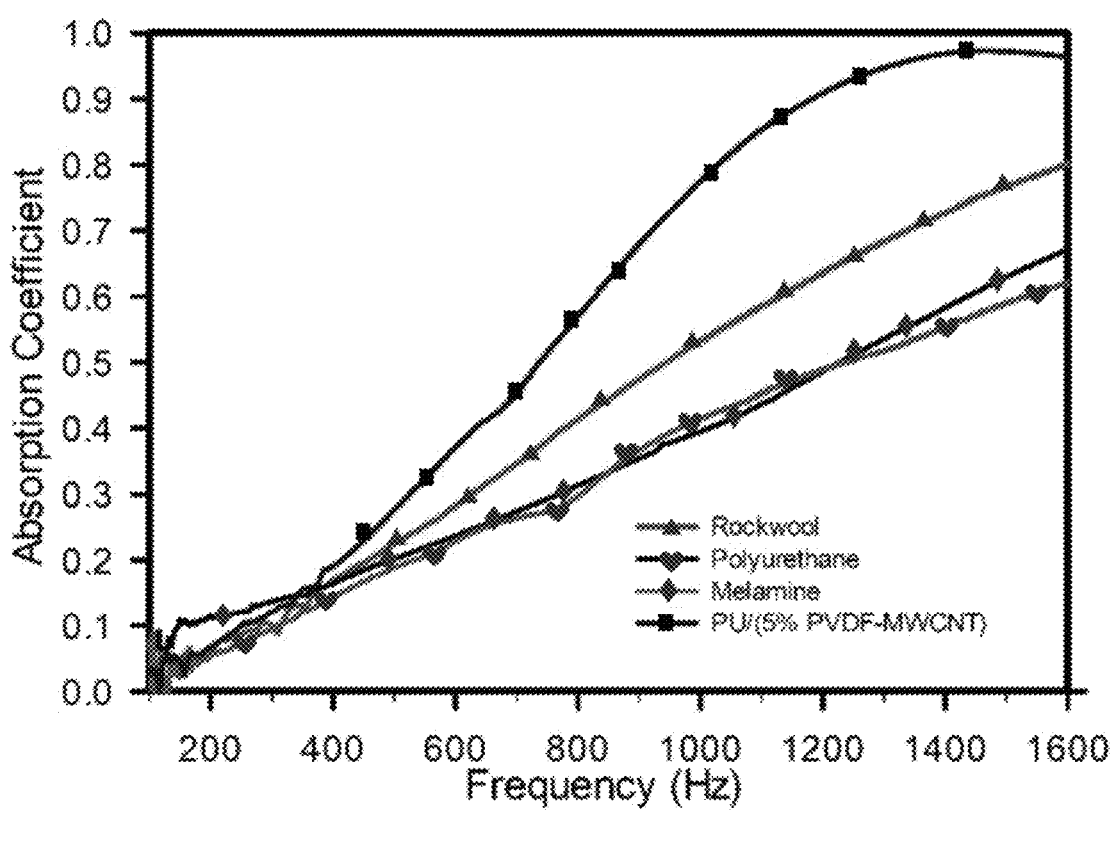
FIG. 6 is a graph comparing sound-absorption coefficients of the porous composite material of FIG. 5 against rock-wool, polyurethane and melamine.

Referring now to FIG. 6, a graph comparing the sound absorption coefficient of the porous composite of PU with 5% of PVDF-CNT filler against original PU and other acoustic foams (rockwool and melamine) as benchmarks is shown. As can be seen from FIG. 6, it was found that the sound absorption coefficient of the composite PU foam with PVDF-CNT filler is significantly higher than that of commercial acoustic foams.

Figure 7:
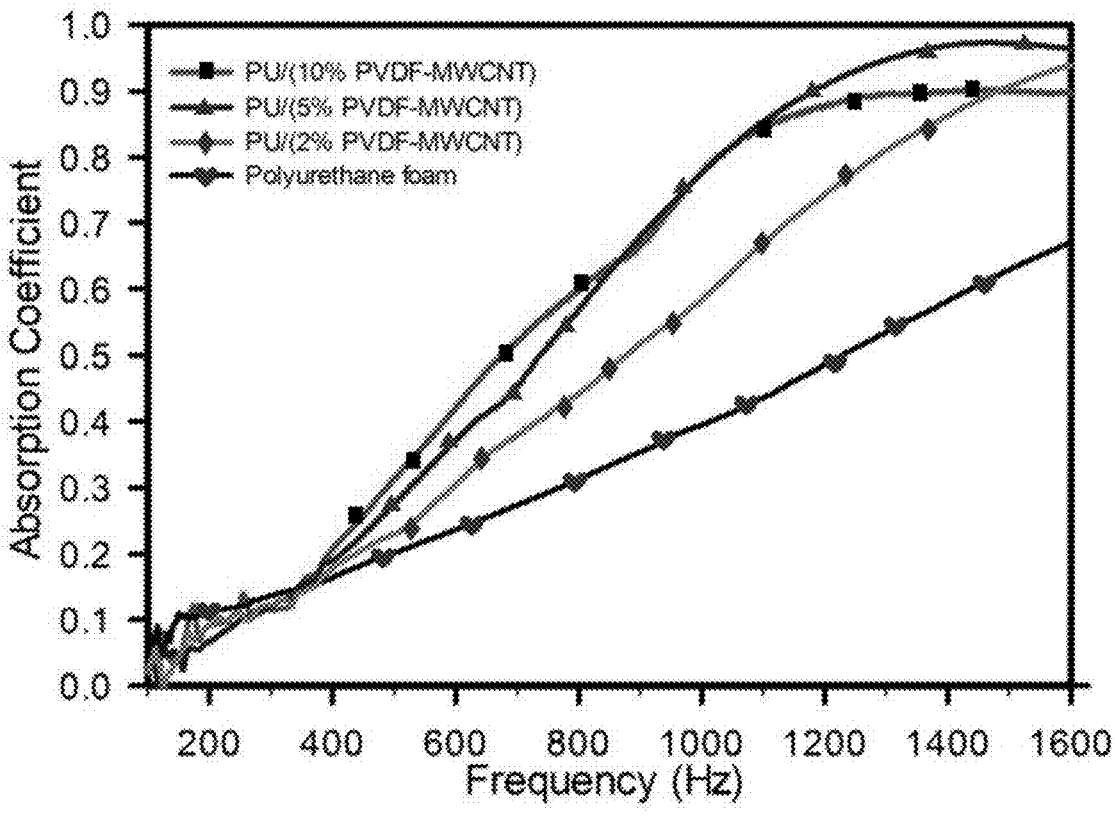
FIG. 7 is a graph comparing sound-absorption coefficients of the porous composite material with different amounts of a piezoelectric hybrid filler material.

The sound absorption coefficient of the composite PU foam with different amounts of PVDF-CNT was also studied and is shown in FIG. 7.

As can be seen from FIGS. 6 and 7, the sound absorption coefficient of the porous composites having only 5 wt % of the piezoelectric hybrid filler is able to reach more than 50% at frequencies higher than 800 Hz in the audible range (approximately 97% above 1.5 kHz), which is significantly higher than the absorption coefficient of the benchmarking porous foams in industry. This demonstrates that as little as 5 wt % of a piezoelectric hybrid filler of PVDF-CNT introduced into PU results in significantly improved sound absorption capability of the PU foam at a lower frequency range.

Example 2

A piezoelectric hybrid filler was produced through an aqueous precipitation process with the same method as described in Example 1 using PVDF as the polymeric piezoelectric material for mechano-electrical energy conversion and graphene as the conductive elements for electro-thermal energy conversion. The concentration of graphene was 3 to 5 wt % of the filler. The piezoelectric hybrid filler was then homogeneously dispersed into PU resins to produce a piezoelectric porous composite with the same method as described in Example 1.

Example 3

A piezoelectric hybrid filler was produced through an aqueous precipitation process with the same method as described in Example 1 using PVDF as the polymeric piezoelectric material for mechano-electrical energy conversion and carbon black as the conductive elements for electro-thermal energy conversion. The concentration of carbon black was 3 to 5 wt % of the filler. The piezoelectric hybrid filler was then homogeneously dispersed into PU resins to produce a piezoelectric porous composite with the same method as described in Example 1.

Example 4

A piezoelectric hybrid filler was produced through an aqueous precipitation process with the same method as described in Example 1 using PVDF as the polymeric electret for mechano-electrical energy conversion and aluminum chloride hexahydrate ($AlCl_3.6H_2O$) as the dielectric lossy elements for electrothermal energy conversion. The concentration of aluminum chloride hexahydrate ($AlCl_3.6H_2O$) was 3 to 5 wt % of the filler. The piezoelectric hybrid filler was then homogeneously dispersed into PU resins to produce a piezoelectric porous composite with the same method as described in Example 1.

Example 5

A piezoelectric hybrid filler was produced through an aqueous precipitation process with the same method as described in Example 1 using polyimide as the polymeric electret for mechano-electrical energy conversion and CNT as the conductive elements for electro-thermal energy conversion. The concentration of CNT was 3 to 5 wt % of the filler. The piezoelectric hybrid filler was then homogeneously dispersed into PU resins to produce a piezoelectric porous composite with the same method as described in Example 1.

Example 6

A piezoelectric porous composite comprising a porous polymer matrix and a piezoelectric hybrid filler was produced through a chemical foam expanding process. A powdered piezoelectric hybrid filler prepared with the same method as described in Examples 1 to 5 was dispersed in a precursor of silicone expanding foam (A-B part foam) before mixing with another precursor using the same method as described in Example 1.

Example 7

A piezoelectric porous composite comprising a porous polymer matrix and a piezoelectric hybrid filler was produced through a chemical foam expanding process. A powdered piezoelectric hybrid filler prepared with the same method as described in Examples 1 to 5 was dispersed in a precursor of latex expanding foam (A-B part foam) before mixing with another precursor using the same method as described in Example 1.

Example 8

The piezoelectric hybrid filler may be added into physical (involving injecting a physical foaming agent or gas directly into molten plastic) or chemical (involving decomposing a chemical foaming agent during an extrusion process to release an expanding gas to create foam) foam extrusion processing. In foam extrusion processing, a piezoelectric hybrid filler is mixed with a thermoplastic polymer to be extruded. In a chemical foam extrusion process, one or more chemical foaming agents are mixed with the thermoplastic polymer to be extruded. During extrusion, the thermoplastic polymer is melted and the one or more chemical foaming agents are decomposed. The pressure of the polymer melt keeps gas generated by the decomposition of the one or more chemical foaming agents dissolved in the polymer melt until the polymer melt exits the extruder. In a physical foam extrusion process, a gas supply is integrated with the extruder. Gas is dispensed into the polymer melt and the gas expands upon exiting the die.

Examples of thermoplastic polymers that can provide porous scaffolds include organic polymers such as, for example, poly(methyl methacrylate) (PMMA), polyamides (PA) or (nylons), polycarbonate (PC), polyester (PES), polyethylene (PE), polyethylene terephthalate (PET), polypropylene (PP), polystyrene (PS), polyurethanes (PU), polyvinyl chloride (PVC), polyvinylidene chloride (PVDC), poly (lactic acid) (PLA), polybenzimidazole (PBI), polyoxymethylene (POM), polyether ether ketone (PEEK), polyetherimide (PEI), polyphenylene oxide (PPO), polyphenylene sulfide (PPS), polyvinylidene fluoride (PVDF), polytetrafluoroethylene (PTFE) and acrylonitrile butadiene styrene (ABS).

A blowing agent may be applied when the mixture of the piezoelectric hybrid filler material with the precursor is in a liquid stage. The blowing agent facilitates formation of a cellular structure via a foaming process in a variety of materials that undergo hardening or phase transition. The chemical blowing agent depends on the melting temperature of thermoplastic polymer, decomposing around the melting temperature of the thermoplastic polymer. The cellular structure in the porous polymer matrix reduces density, increases thermal insulation and airborne acoustic absorption.

To produce a piezoelectric porous composite comprising a porous polymer matrix and a piezoelectric hybrid filler through chemical foam extrusion processing, 1-10 parts of the piezoelectric hybrid filler (prepared according to the method described in Examples 1-5), 1-10 parts of a chemical foaming agent and 90 parts of a thermoplastic polymer may be physically blended and then filled into an extruder. The chemical foaming agent decomposes during the extrusion process of the molten polymer, releasing an expanding gas to create the foam.

Example 9

To produce a piezoelectric porous composite comprising a porous polymer matrix and a piezoelectric hybrid filler through physical foam extrusion processing, 1-10 parts of the piezoelectric hybrid filler (prepared according to the method described in Examples 1-5), and 90 parts of a thermoplastic polymer may be physically blended and then filled into an extruder. The foaming process involves continuous injection of a gas such as nitrogen directly into the extruder filled with the molten thermoplastic polymer at an elevated temperature. An extruder screw is utilized to create a polymer-gas mixture and the gas in the polymer melt expands upon exiting the die to create the foam.

As is evident from the foregoing discussion, the present invention provides a scalable and inexpensive method of producing a porous composite material with improved sound absorption capabilities. With the method of the present invention, a small amount of piezoelectric hybrid filler can be mixed through a low cost scalable process into various low cost porous polymeric materials to realize superior sound absorption performance, particularly at relatively lower frequency ranges for airborne sound absorption, at low material and processing cost.

While preferred embodiments of the invention have been described, it will be clear that the invention is not limited to the described embodiments only. Numerous modifications, changes, variations, substitutions and equivalents will be apparent to those skilled in the art without departing from the scope of the invention as described in the claims. The porous composite material of the present invention with improved sound absorption capabilities may be used for airborne noise mitigation in green building and urban sustainability projects and in transportation, shipping, and automotive applications. The porous composite material of the present invention with improved airborne sound absorption capabilities may also be used in audio facilities and instruments as well as for personal hearing protection.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method of producing a porous composite material for sound absorption, comprising:
    preparing a mixture of mechano-electrical conversion elements and electro-thermal conversion elements in an organic solvent;
    mixing the mixture of the mechano-electrical conversion elements and the electro-thermal conversion elements in the organic solvent with an aqueous solvent to precipitate a piezoelectric hybrid filler material;
    mixing 1 to 10 wt. % of the piezoelectric hybrid filler material based upon the total weight of the porous composite material with a precursor; and
    performing a foaming operation with the precursor to produce the porous composite material.

2. The method of claim 1, wherein the step of preparing the mixture of the mechano-electrical conversion elements and the electro-thermal conversion elements in the organic solvent comprises:
    dissolving the mechano-electrical conversion elements in the organic solvent; and
    dispersing the electro-thermal conversion elements in the organic solvent.

3. The method of claim 1, wherein the mechano-electrical conversion elements comprise one of a piezoelectric polymer and a polymeric electret.

4. The method of claim 3, wherein the piezoelectric polymer is selected from a group consisting of polyvinylidene fluoride (PVDF), poly (vinylidene fluoride-trifluoroethylene) (PVDF-TrFE) and poly (vinylidene fluoride-hexafluoropropylene) (PVDF-HFP).

5. The method of claim 3, wherein the polymeric electret is selected from a group consisting of polyimide, polypropylene, polyethylene terephthalate (PET), polytetrafluoroethylene, polymethylmethacrylate, and ethylene vinyl acetate cyclic olefin copolymers.

6. The method of claim 1, wherein the electro-thermal conversion elements comprise one of electrically conductive elements and dielectric lossy elements.

7. The method of claim 6, wherein the electrically conductive elements are selected from a group consisting of single-walled carbon nanotubes (SWCNT), multi-walled carbon nanotubes (MWCNT), graphene and carbon black.

8. The method of claim 6, wherein the dielectric lossy elements are selected from a group consisting of aluminium nitrate nonahydrate, aluminium chloride hexahydrate $(AlCl_3.6H_2O)$, tetra-n-butylammonium chloride and ammonium acetate.

9. The method of claim 8, wherein the piezoelectric hybrid filler material comprises between about 10 percent by mass (wt %) and about 50 wt. % of the dielectric lossy elements.

10. The method of claim 1, wherein the foaming operation comprises one of a physical foam extrusion process, a chemical foam extrusion process and a chemical foam expanding process.

11. The method of claim 1, wherein the step of mixing the piezoelectric hybrid filler material with the precursor comprises:
    mixing between about 1 wt. % and about 10 wt. % of the piezoelectric hybrid filler material and between about 90 wt. % and about 98 wt. % of the precursor, based upon the total weight of the porous composite material wherein the precursor is a thermoplastic polymer.

12. The method of claim 11, further comprising mixing between about 1% by mass and about 10% by mass of a foaming agent with the piezoelectric hybrid filler material and the precursor.

13. The method of claim 11, wherein the thermoplastic polymer is selected from a group consisting of poly (methyl methacrylate) (PMMA), polyamide (PA), polycarbonate (PC), polyester (PES), polyethylene (PE), polyethylene terephthalate (PET), polypropylene (PP), polystyrene (PS), polyurethane (PU), polyvinyl chloride (PVC), polyvinylidene chloride (PVDC), poly (lactic acid) (PLA), polybenzimidazole (PBI), polyoxymethylene (POM), polyether ether ketone (PEEK), polyetherimide (PEI), polyphenylene oxide (PPO), polyphenylene sulfide (PPS), polyvinylidene fluoride (PVDF), polytetrafluoroethylene (PTFE) and acrylonitrile butadiene styrene (ABS).

14. The method of claim 1, wherein the step of mixing the piezoelectric hybrid filler material with the precursor comprises:
    mixing between about 1 part and about 10 parts by weight of the piezoelectric hybrid filler material with between about 50 parts and about 100 parts by weight of the precursor and between about 1 part and about 2.5 parts by weight of fire-retardant agent to form a set of reagents.

15. The method of claim 14, wherein the step of performing the foaming operation comprises:
    reacting the set of reagents with about 25 parts of the precursor.

16. The method of claim 14, wherein the precursor comprises one of polyurethane (PU), silicone and latex.

17. A porous composite material for sound absorption, comprising:

a porous polymer matrix; and a piezoelectric hybrid filler dispersed in the porous polymer matrix, wherein the piezoelectric hybrid filler comprises a homogenous mixture of mechano-electrical conversion elements and electro-thermal conversion elements;

wherein the porous composite material comprises 1-10 wt. % of the piezoelectric hybrid filler based on the total weight of the composite material.

18. The porous composite material of claim 17, wherein the porous polymer matrix comprises at least one of the group consisting of polyurethane (PU), silicone, latex, and a thermoplastic polymer.

19. The porous composite material of claim 18, wherein the thermoplastic polymer is selected from the group consisting of poly (methyl methacrylate) (PMMA), polyamide (PA), polycarbonate (PC), polyester (PES), polyethylene (PE), polyethylene terephthalate (PET), polypropylene (PP), polystyrene (PS), polyurethane (PU), polyvinyl chloride (PVC), polyvinylidene chloride (PVDC), poly (lactic acid) (PLA), polybenzimidazole (PBI), polyoxymethylene (POM), polyether ether ketone (PEEK), polyetherimide (PEI), polyphenylene oxide (PPO), polyphenylene sulfide (PPS), polyvinylidene fluoride (PVDF), polytetrafluoroethylene (PTFE) and acrylonitrile butadiene styrene (ABS).

20. The porous composite material of claim 17, wherein the mechano-electrical conversion elements comprise one of a piezoelectric polymer and a polymeric electret.

21. The porous composite material of claim 20, wherein the piezoelectric polymer is selected from the group consisting of polyvinylidene fluoride (PVDF), poly (vinylidene fluoride-trifluoroethylene) (PVDF-TrFE) and poly (vinylidene fluoride-hexafluoropropylene) (PVDF-HFP).

22. The porous composite material of claim 20, wherein the polymeric electret is selected from the group consisting of polyimide, polypropylene, polyethylene terephthalate (PET), polytetrafluoroethylene, polymethylmethacrylate, and ethylene vinyl acetate cyclic olefin copolymers.

23. The porous composite material of claim 17, wherein the electro-thermal conversion elements comprise one of electrically conductive elements and dielectric lossy elements.

24. The porous composite material of claim 23, wherein the electrically conductive elements are selected from the group consisting of single-walled carbon nanotubes (SWCNT), multi-walled carbon nanotubes (MWCNT), graphene and carbon black.

25. The porous composite material of claim 23, wherein the dielectric lossy elements are selected from the group consisting of aluminium nitrate nonahydrate, aluminium chloride hexahydrate ($AlCl_3.6H_2O$), tetra-n-butylammonium chloride and ammonium acetate.

26. The porous composite material of claim 25, wherein the piezoelectric hybrid filler comprises between about 10 percent by mass (wt. %) and about 50 wt. % of the dielectric lossy elements.

\*     \*     \*     \*     \*